United States Patent
Rodrigues et al.

(10) Patent No.: US 6,397,139 B1
(45) Date of Patent: May 28, 2002

(54) SYSTEM AND METHOD FOR CONTROLLING A TRANSFER CASE WITHIN A VEHICLE HAVING VARIATIONS IN TIRE DIAMETER

(75) Inventors: Ashok Rodrigues, Farmington Hills; John Glab, Riverview, both of MI (US)

(73) Assignee: Ford GLobal Tech., Inc., Dearborn, MI (US)

( * ) Notice: Subject to any disclaimer, the term of this patent is extended or adjusted under 35 U.S.C. 154(b) by 0 days.

(21) Appl. No.: 09/774,153

(22) Filed: Jan. 30, 2001

(51) Int. Cl.[7] .......................... G06F 7/00; B60K 17/344
(52) U.S. Cl. ............................ 701/89; 701/69; 180/248
(58) Field of Search ............................ 701/89, 90, 69; 180/197, 248

(56) References Cited

U.S. PATENT DOCUMENTS 5,479,348 A * 12/1995 Sasaki .................... 364/426.03
5,701,247 A * 12/1997 Sasaki ................. 364/424.098

* cited by examiner

Primary Examiner—Yonel Beaulieu
(74) Attorney, Agent, or Firm—Ford GLobal Tech., Inc

(57) ABSTRACT

A transfer case control system or apparatus 10 is provided for use on a four-wheel drive vehicle of the type having a transfer case 32, a front driveshaft 22 and a rear driveshaft 26. Transfer case control system 10 includes a conventional microcontroller or controller 40 having a memory unit 42 and operating under stored program control. Controller 40 selectively generates a control signal which controls the amount of torque provided to driveshafts 22, 26. Controller 40 provides an improved torque adjustment "response" by automatically adjusting to the condition of the vehicle's tires.

20 Claims, 3 Drawing Sheets

| COLUMN SWITCHPOINT (KPH) | 0 | 8 | 16 | 24 | 32 | 40 | 48 | 56 | 64 | 72 | 80 | 88 | 96 | 104 | 112 | 120 | 128 | 136 | 144 | 152 |
|---|---|---|---|---|---|---|---|---|---|---|---|---|---|---|---|---|---|---|---|---|
| R_RATCHET_INDEX=1 | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. |
| R_RATCHET_INDEX=2 | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. |
| R_RATCHET_INDEX=3 | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. |
| R_RATCHET_INDEX=4 | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. | R_SV.. |

Fig. 4

SYSTEM AND METHOD FOR CONTROLLING A TRANSFER CASE WITHIN A VEHICLE HAVING VARIATIONS IN TIRE DIAMETER

FIELD OF THE INVENTION

This invention relates to a system and method for controlling a transfer case and more particularly, to a system and method for controlling a transfer case within a four-wheel drive vehicle having variations in tire diameter, such as those caused by tire wear and inflation, and which provides an improved response by automatically adjusting to the condition of the vehicle's tires.

BACKGROUND OF THE INVENTION

Four-wheel drive vehicles typically include a transfer case which selectively transfers torque and power from the vehicle's input shaft to a front and a rear driveshaft, thereby selectively rotating the front and rear driveshafts. The transfer case includes a conventional electromagnetic clutch assembly which typically and selectively transfers torque from a primary driveshaft (e.g., the rear driveshaft) to a secondary driveshaft (e.g., the front driveshaft), thereby reducing the torque provided to the primary driveshaft and increasing the torque provided to the secondary driveshaft. The clutch assembly is typically and communicatively coupled to a controller and/or a control system which determines the amount of torque that is to be provided to the front and rear driveshafts based upon vehicle sensory data, and which generates a control or command signal to the clutch assembly, thereby controlling the amount of torque which is provided to the front and rear driveshafts.

In order to provide torque and traction to the front and rear wheels of the vehicle and to avoid relative slip between the front and rear wheels, the transfer case control system typically monitors and adjusts the speed of both the front and rear driveshafts. For example and without limitation, when the speed of the front wheels differs from the speed of the rear wheels by a certain predetermined amount or "error", these prior systems alter or change the value of the control or command signal to provide more or less torque to the front and/or rear driveshaft in order to prevent relative slip between the front and rear wheels. Particularly, these prior systems typically alter the magnitude of the control signal when the difference between the speed of the front and rear driveshafts (e.g., the "delta shaft speed") exceeds an "allowable slip" factor or value.

The "allowable slip" factor is utilized in order to account for variations in tire wear and inflation, which can cause a difference in the speed of the front and rear axles and driveshafts by changing the effective rolling radius of the individual tires. Since this type of speed difference results "naturally" from the physical attributes of the tires and the tire/road interface, and not from relative slip between the front and rear wheels of the vehicle, the "allowable slip" factor or value is necessary to prevent the control system from constantly activating or attempting to prevent the tires from rotating at their "natural" speed. Unnecessary and repeated activation of the control system caused by variations in tire wear and inflation could cause noise and vibration harshness ("NVH") problems and unnecessary wear of the tires, clutch assembly, and other drivetrain components.

For these reasons, prior transfer case control systems typically set or establish a relatively "generous" or large allowable slip factor in order to account for the "worst" or largest possible wheel speed difference that could occur "naturally" as a result of variations in tire wear and inflation. This allowable slip factor or value typically varies based upon the speed of the vehicle, and is determined or calculated by way of a table or matrix stored within the memory of the system. The allowable slip factor or value also typically varies based upon whether the front or the rear wheels of the vehicle are slipping (e.g., prior systems typically include a rear slip table having allowable "rear slip values" and a front slip table having allowable "front slip values").

While these prior systems do reduce the likelihood of unnecessary activation and/or cycling of the transfer case in response to variations in the effective diameter of the tires, they suffer from some drawbacks. Particularly, because the allowable slip factors or values utilized by these systems are relatively large or "generous", when a true slip event occurs, a relatively high degree of slip must be achieved before the controller detects or determines that a slip condition has occurred which is not attributable to variations in tire wear and inflation. For example and without limitation, if a vehicle having substantially matching or equal tire wear and inflation is being driven at 100 kilometers per hour ("kph"), and the allowable rear slip factor or value is 3 kph, the speed of the rear wheels would have to exceed 103 kph, which may represent a relatively severe slip condition, before a slip control would be generated effective to transfer torque to the front wheels of the vehicle. Hence, the overall torque adjustment "response" of these prior systems is adversely effected due to these "generous" slip factors which delay the systems' ability to respond until a relatively high degree of slip has occurred.

There is therefore a need for a system and method for controlling a transfer case within a four-wheel drive vehicle which provides an improved response by automatically adjusting to the condition of the vehicle's tires.

SUMMARY OF THE INVENTION

A first advantage of the invention is that it provides a system and method for controlling a transfer case within a four-wheel drive vehicle which overcomes at least some of the previously delineated drawbacks of the prior systems, devices, and/or methods.

A second advantage of the invention is that it provides a system and method for controlling a transfer case within a four-wheel drive vehicle which monitors relative slip between the front and rear wheels of the vehicle and which provides a relatively quick response to relative slip situations.

A third advantage of the invention is that it provides a system and method for controlling a transfer case within a four-wheel drive vehicle which automatically generates "less generous" or "tighter" allowable slip values based upon the condition of the vehicle's tires.

According to one aspect of the present invention, a system for controlling a transfer case in a vehicle is provided. The vehicle is of the type having a front driveshaft which rotatably drives a pair of front wheels having a first effective diameter at a first speed, and a rear driveshaft which rotatably drives a pair of rear wheels having a second effective diameter at a second speed. The transfer case is effective to selectively transfer torque to the front driveshaft and to the rear driveshaft. The system includes a first sensor which measures the first speed and which generates a first signal which represents the first speed; a second sensor which measures the second speed and which generates a second signal which represents the second speed; and a controller which is communicatively coupled to the transfer case and to the first sensor and the second sensor. The controller receives the first signal and the second signal, and calculates a difference value between the first speed and the second speed. The controller is adapted to selectively generate a slip control signal when the difference value exceeds an allowable slip value. The controller is further adapted to selectively alter the slip value based upon the first effective diameter and the second effective diameter.

According to a second aspect of the present invention, a method for controlling a transfer case is provided. The transfer case is operatively disposed within a four wheel drive vehicle of the type having a pair of front wheels having a first effective diameter and a pair of rear wheels having a second effective diameter, a front driveshaft which is effective to rotate the front wheels at a first speed, and a rear driveshaft which is effective to rotate the rear wheels at a second speed. The transfer case is adapted to selectively provide torque to the front driveshaft and the rear driveshaft. The method includes the steps of: selectively generating a first and a second allowable rear slip value; determining whether a difference exists between the first and the second effective diameters; selecting a unique one of the first and the second allowable rear slip values based upon the determination; measuring the first speed and the second speed; and selectively generating a first signal if the second speed exceeds the first speed by a margin greater than the selected unique one of the first and the second allowable rear slip values, the first signal being effective to control the torque which is provided to the front and the rear driveshafts.

Further objects, features, and advantages of the invention will become apparent from the following detailed description of the preferred embodiment of the invention and by reference to the following drawings.

BRIEF DESCRIPTION OF THE DRAWINGS

FIG. 4 illustrates an example of a slip table utilized by the system shown in FIG. 1.

DETAILED DESCRIPTION OF THE PREFERRED EMBODIMENT OF THE INVENTION

Figure 1:
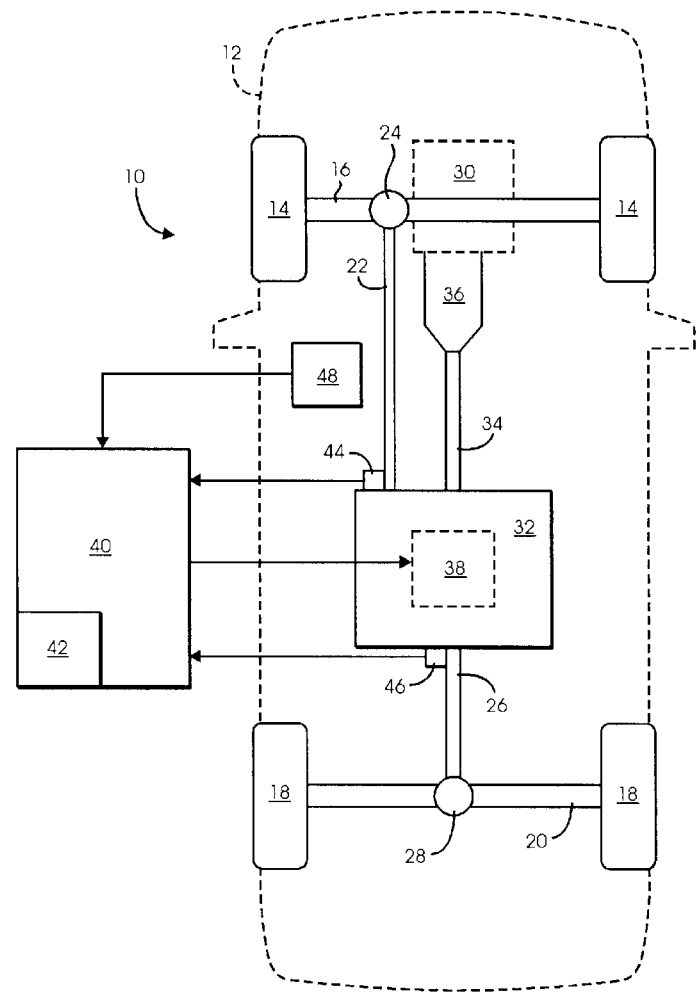
FIG. 1 is a schematic diagram of a four-wheel drive vehicle including a control system which incorporates the teachings of the preferred embodiment of the invention.

Referring now to FIG. 1, there is shown a transfer case control system or apparatus 10 made in accordance with the teachings of the preferred embodiment of the invention. As shown, system 10 is deployed upon a four-wheel drive vehicle 12 having a pair of front wheels 14 which are operatively mounted upon a front axle 16, and a pair of rear wheels 18 which are operatively mounted upon a rear axle 20. Front axle 16 is operatively coupled to and receives torque and power from a front driveshaft 22 through a front differential assembly 24, and rear axle 20 is operatively coupled to and receives torque and power from a rear driveshaft 26 through a rear differential assembly 28.

Front and rear driveshafts 22, 26 selectively receive torque and power from the vehicle engine 30 through the transfer case 32. Particularly, torque and power generated by the engine 30 is delivered to transfer case 32 through an input shaft 34 which is coupled to the transmission system or assembly 36. Transfer case 32 includes a conventional electromagnetic clutch assembly 38 which selectively provides torque to the front driveshaft 22 and to the rear driveshaft 26. In the preferred embodiment of the invention, clutch assembly 38 is a conventional "torque-on-demand" type clutch assembly. It should be appreciated that the terms "front" and "rear" are used herein for convenience purposes only (e.g., to respectively refer to a secondary and primary driveshaft), and in alternate embodiments of the invention, the front and rear driveshafts may be interchanged (e.g., the front driveshaft may act as the primary driveshaft).

Transfer case control system 10 includes a conventional microcontroller or controller 40 having a memory unit 42 and operating under stored program control. Controller 40 is electrically, physically, and communicatively coupled to sensors 44, 46, 48, and to clutch assembly 38. Controller 40 receives signals generated by sensors 44–48, processes and utilizes the received signals to determine the amount of torque which is to be respectively provided to front and rear driveshafts 22, 26, and based upon this determination, generates a command signal to selectively activate the clutch assembly 38, thereby selectively providing torque to the front driveshaft 22 and/or the rear driveshaft 26.

In the preferred embodiment, controller 40 is a conventional powertrain controller including one or more microprocessors and subprocessors which cooperatively perform the below-described calculations, subroutines and/or processes. Controller 40 generates a pulse-width-modulated ("PWM") signal which controls the amount of slippage between plates of the clutch assembly 38, thereby controlling the amount of torque and power which is transferred to front driveshaft 22 and the rear driveshaft 26 from the input shaft 34. Particularly, the duty cycle of the PWM signal (i.e., the amount or percentage of the cycle time for which the signal is activated or "enabled") controls the amount of torque which is being transferred to the respective driveshafts 22, 26. The value output signal of the controller 40 to the clutch assembly 38 is discussed interchangeably herein as a "duty cycle" percentage or value output and/or as a "torque providing" value.

In the preferred embodiment of the invention, memory 42 is a conventional memory unit including both permanent and temporary memory, and is adapted to and does store at least a portion of the operating software which directs the operation of controller 40. Moreover, memory 42 is adapted to selectively store other types of data or information, including information associated with the operation of the preferred embodiment of the invention and/or associated historical data, processing data, and/or operational data. As will be more fully discussed below, examples of such data include, but are not limited to, data relating to the speeds of driveshafts 22, 26, "delta shaft speed" values, and other engine operating data, which are used by controller 40 to determine the amount of torque that should be provided to driveshafts 22, 26. Memory 42 also stores various allowable slip values and threshold values which are utilized to determine whether a slip control signal output or duty cycle should be transmitted, and whether the allowable slip values should be "tightened" or "ratcheted". These values are preferably held within one or more matrixes or database tables which are stored within memory 42. As should also be apparent to those of ordinary skill in the art, controller 40 and memory 42 may actually comprise a plurality of commercially available, conventional, and disparate chips or devices, which are operatively and communicatively linked in a cooperative manner.

Sensors 44 and 46 comprise conventional and commercially available sensors which respectively measure the rotational speed of the front driveshaft 22 and the rear driveshaft 26, and which each generate and communicate a signal representing each of these measured speeds to controller 40. In other alternate embodiments, sensors 44, 46 are replaced with wheel speed sensors. Sensors 48 comprise conventional and commercially available vehicle operating condition sensors, and may include one or more conventional engine or vehicle speed and/or acceleration sensors, and one or more "fault" detection sensors, which detect faults or abnormalities in the operation of engine 30 or in the operation of other components of vehicle 12.

Sensors 44–48 provide data representing the above-delineated measured values to controller 40, which utilizes these values to generate a PWM signal which is transmitted to transfer case 32 and/or clutch assembly 38, thereby selectively controlling the power and torque which is provided to driveshafts 22 and 26. It should be appreciated that sensors 44–48 may include filtering and/or processing devices or circuits (e.g., low pass, high pass, and/or band pass filters) which filter and/or process the measured or sensed data prior to sending the data to controller 40.

Figure 2:
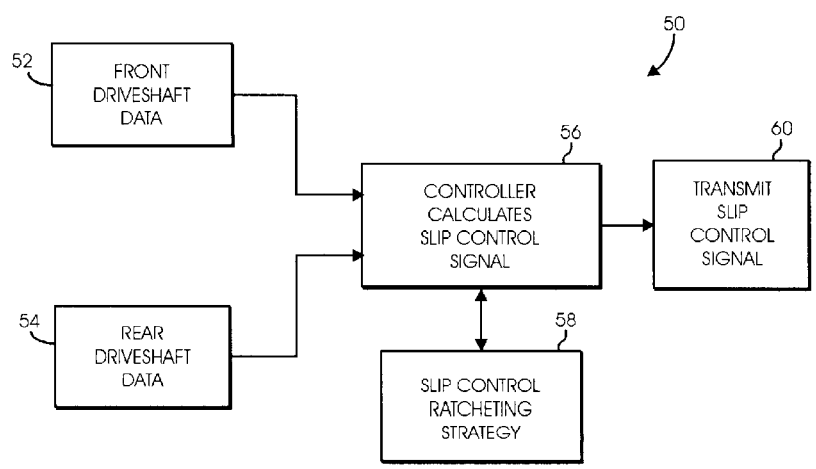
FIG. 2 is a block diagram illustrating the broad functionality of the control system shown in FIG. 1.

To understand the general operation of system 10, reference is now made to "flow chart" or diagram 50 of FIG. 2, illustrating the broad functionality of system 10. As shown, data 52 represents the speed of the front driveshaft 22, which is derived in a known manner from the measurements taken by sensor 44. Controller 40 processes the driveshaft speed data received from sensor 44 and uses conventional algorithms and/or equations to determine and/or estimate the speed of the vehicle's front wheels 14. Data 54 represents the speed of the rear driveshaft 26, which is derived in a known manner from the measurements taken by sensor 46 (i.e., in a manner substantially identical to that described with respect to data 52) and is used to determine the speed of the vehicle's rear wheels 18.

As illustrated in block 56, controller 40 receives the data 52, 54 and utilizes the data 52, 54 to determine whether a slip control signal should be generated to control or prevent relative slip between the front and rear wheels 14, 18. If such a determination is made, controller 40 calculates and generates a slip control signal, which has a value based upon certain slip conditions, such as by way of example and without limitation the "delta shaft speed" (i.e., the difference between the speed of the rear driveshaft 26 or wheels 18 and the speed of the front driveshaft 22 or wheels 14). Controller 40 determines whether to generate a slip control signal by use of the allowable slip factor which is calculated or generated by use of the slip control "ratcheting" strategy, procedure or subroutine 58. The resulting slip control signal is transmitted to the transfer case 32, as illustrated in functional block or step 60, and is effective to selectively control the amount of torque which is supplied to the front driveshaft 22 and to the rear driveshaft 26.

The value and duration of the slip control signal, which is generated in functional block or step 56, is selectively determined in a known manner by use of a control strategy or equation stored within memory 42. A "rear slip" control signal is generated when the delta shaft speed is positive, and a "front slip" control signal is generated when the delta shaft speed is negative.

More particularly, a rear slip control signal is generated when the speed of the rear driveshaft 26 exceeds the speed of the front driveshaft 22 (i.e., when the delta shaft speed is positive) and exceeds an allowable rear slip margin or factor, and a front slip control signal is generated when the speed of the front driveshaft 22 exceeds the speed of the rear driveshaft 26 (i.e., the delta shaft speed is negative) by front slip margin or factor.

The front and rear slip margins are each respectively stored within a front slip table or matrix and a rear slip table or matrix which are each held within memory 42. Each table or matrix includes a plurality of "slip" values. Each of the "slip" values corresponds to a particular front or rear shaft speed value or range of values, and each represents an amount of relative slip which is considered "allowable" at that particular speed or range of speeds. In the preferred embodiment of the invention, the current front shaft speed is used to reference or "index" the column of the front slip table in which the front slip value is selected. The rear slip table is referenced or "indexed" in a similar manner, but uses the "slower" of the two shaft speeds. Both the front and rear slip tables are also referenced using a "ratchet_index" value which provides the row in which the respective front and rear slip values are selected, as more fully and completely described below.

Importantly, each slip table (e.g., the front and rear slip tables) includes several rows which each contains an increasingly "tighter" or "less generous" set of allowable slip values. To more fully understand the construction of these slip tables, reference is now made to FIG. 4 which represents one non-limiting example of a rear slip table 100 made in accordance with the teachings of the preferred embodiment of the invention. As shown in FIG. 4, table 100 includes eighty (80) allowable rear slip values (i.e., $R\_SV_{1,1}$, through $R\_SV_{4,20}$). The allowable rear slip values are arranged in twenty columns (i.e., columns 110–148) and four rows (i.e., rows 102–108). Each column 110–148 corresponds to a "switch point" or speed value in kilometers per hour ("kph"). The slip points shown are for illustrative purposes only and the slip point values may be modified or calibrated based upon the application. In order to determine which column to reference or select, controller 40 determines the highest "switch point" that the current vehicle speed value, as calculated by use of the lower of the two driveshaft (or wheel) speeds, exceeds. For instance, if the slowest shaft speed corresponds to a speed of 45 kph, controller 40 references or selects column 120. Controller 40 indexes or references the row which is used to determine the slip value by use of the current "ratchet_index" value which is stored within memory 42, and which is selectively altered by way of "ratcheting" strategy or procedure 58.

Each row 102–108 holds a "tighter" or smaller set of allowable slip values. The most "generous" or largest set of values (i.e., $R\_SV_{1,1}$ –$R\_SV_{1,20}$) is stored within row 102 and corresponds to a "ratchet_index" value of one (1), and the "tightest" or smallest set of values (i.e., $R\_SV_{4,1}$ –$R\_SV_{4,20}$) is stored within row 108 and corresponds to a "ratchet_index" value of four (4). It should be appreciated that the front slip table is substantially similar to rear slip table 100, except that it contains different slip values (i.e., $F\_SV_{1,1}$ –$F\_SV_{4,20}$). It should further be appreciated that in alternate embodiments, different and/or additional numbers of rows and columns may be used in generating the front and/or rear slip tables.

In the preferred embodiment of the invention, each of the slip values (e.g., $R\_SV_{1,1}$ –$R\_SV_{4,20}$ and $F\_SV_{1,1}$–$F\_SV_{4,20}$) is calculated using a minimum amount of "calibrated" or predetermined values (i.e., values established through controlled testing and/or experimentation), in order to preserve space within memory unit 42. In the preferred embodiment, the slip values corresponding to lower speeds (e.g., the slip values in columns 110–116) remain constant throughout their respective columns regardless of the ratchet_index value (e.g., $R\_SV_{1,1} = R\_SV_{1,2} = R\_SV_{1,3} = R\_SV_{1,4}$). Slip values in higher indexed columns (e.g., the slip values in column indexes #5–#19 or columns 118–146) are calculated by use of the following equation:

slip value=ROUND [allowable_slip_percentage * upper_bound_speed]+rear_offset    (Eq. 1)

where the allowable_slip_percentage is a predetermined percentage value for the specific row 102–108 in which the value resides (e.g., each row 102, 104, 106 and 108 has a progressively smaller allowable_slip_percentage), the upper_bound_speed is the speed in kph which corresponds to the "switch point" of the next highest column (i.e., the upper_bound_speed for column 118 is 40 kph), and the rear_offset is a predetermined calibratable offset value. When calculating Equation 1, the product of the allowable_slip_percentage and the upper_bound_speed is rounded to the next highest ¼ kph. The highest slip table column (i.e., column 148) is calculated by use of Equation 1, with the exception that the upper_bound_speed is replaced with the highest possible speed that driveshafts 22, 26 or vehicle 12 can achieve. It should be appreciated that while the above described calculations are made with reference to the rear slip table 100, substantially similar calculations are used to generate the values of the front slip table. It should further be appreciated that the slip values will decrease as the ratchet_index value or row number increases, thereby providing "tighter" and/or smaller slip values in higher numbered rows. In the preferred embodiment of the invention, the slip values within the front and rear slip tables are stored within memory 42 and are generated each time the control system 10 is connected to electrical power source.

Figure 3:
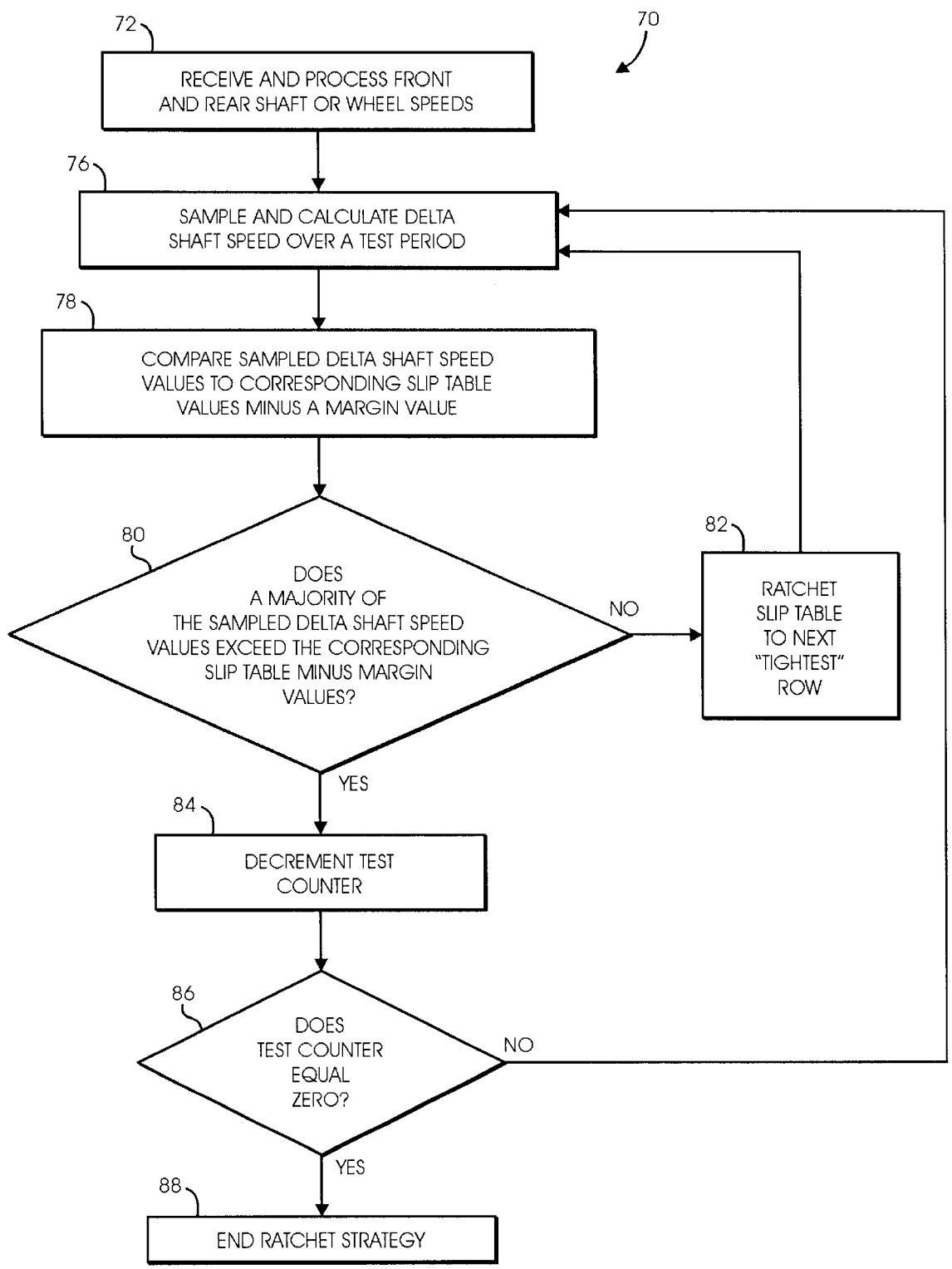
FIG. 3 is a block diagram illustrating the detailed operational functionality of the control system shown in FIG. 1.

To more fully understand the operational functionality of the novel "ratcheting strategy" which is executed and/or performed by system 10, reference is now made to the operational flow diagram or "flow chart" 70 of FIG. 3. As shown in functional block or step 72, controller 40 receives and processes the shaft speed data 52, 54 and determines the speeds of the front driveshaft 22 and/or wheels 14 and the rear driveshaft 26 and/or wheels 18.

Once the vehicle speed data is received, controller 40 proceeds to functional block or step 76. In the preferred embodiment of the invention, controller 40 monitors the vehicle speed while the ratcheting strategy is being performed, and terminates the ratcheting strategy as soon as the vehicle speed drops below the ratcheting speed threshold value or exceeds a high threshold value. In one non-limiting embodiment, controller 40 also ensures that the current duty cycle being transmitted to the clutch assembly is less than a threshold value prior to executing or performing the "ratcheting" strategy or procedure. In another non-limiting embodiment, controller 40 monitors a throttle position based strategy output and performs the ratcheting strategy only if the vehicle's throttle position strategy output does not exceed a certain value. Controller 40 may also monitor other vehicle attributes, such as the steering wheel angle, to determine whether or not to terminate the ratcheting strategy.

In functional block or step 76, controller 40 calculates or samples the delta shaft speed (e.g., by subtracting the speed of the front driveshaft 22 from the speed of the rear driveshaft 26) over a predetermined period of time, thereby generating a plurality of delta shaft speed values. Controller 40 next compares the plurality of sampled delta shaft speed values to slip values held within the front or rear slip table minus a calibratable and predetermined margin value, as illustrated in functional block or step 78 and as described below.

If the sampled delta shaft speed values are positive, controller 40 references the rear slip table, and if the delta shaft speeds are negative, controller 40 references the front slip table. Each sampled delta shaft speed value is compared to the slip table value which is contained within the column that corresponds to the current vehicle speed (e.g., column 110–148), and within the row corresponding to the current ratchet_index value plus one, minus the calibratable margin value. It should be appreciated that the ratchet_index value is equal to one (1), which represents the most "generous" set of slip values, when the system 10 is initially "powered-up" or connected to a source of electrical power.

If a majority of the sampled delta shaft speed values do not exceed the corresponding slip table values minus the margin value (e.g., when the average or effective diameter of the front wheels 14 are substantially identical to the average or effective diameter of the rear wheels 18), the slip table is "tightened" or "ratcheted", as illustrated in functional block or step 82. Particularly, the ratchet_index value is incremented by one (1), thereby causing the next "tightest" row or set of slip values to be indexed or referenced by controller 40. Steps 76–82 are then repeated until the "tightest" row or ratchet_index value is achieved (e.g., row 108 or ratchet_index value=four (4)), or until the comparison or test performed within step 80 is affirmative. Once the ratchet_index value equals four (4), ratcheting is complete.

When the test performed in step 80 is affirmative (i.e., when a majority of the sampled speed values do exceed the corresponding slip table value minus the margin value, thereby indicating that there may be variations in the average or effective diameter of front wheels 14 and the rear wheels 18), controller 40 proceeds to functional block or step 84. A counter is stored within memory 42 and is decreased by one each time the test of step 80 is affirmative. The counter is initially set to an integer value, which represents the number of test repeats or "retries" that are desired. In functional block or step 86, controller 40 reads the test counter, and if the test counter does not equal zero, controller 40 returns to step 76 and repeats the "ratcheting" test or procedure. Once the value of the test counter is equal to zero, the ratcheting strategy is terminated, as illustrated in functional block or step 88.

It should be appreciated that when the condition or effective diameters of the front wheels 14 and the rear wheels 18 are substantially identical (e.g., when the front and rear wheels 14, 18 have substantially identical wear and inflation conditions), a higher degree of "ratcheting" or tightening is achieved. Hence, the slip values required to generate a slip control output signal are automatically adjusted or "tightened" by system 10 in response to the current tire wear and inflation condition of wheels 14, 18. In this manner, system 10 provides a quicker response to potential slip conditions based upon the degree of uniformity which is present in the wear and/or inflation of the vehicle's tires.

It should be appreciated that in alternate embodiments, the above-described functional steps may be performed in a different order or procedure, and may include other control and/or slip prevention subroutines and/or procedures which are used in conjunction with the functional steps described herein.

It is understood that the various inventions are not limited to the exact construction illustrated and described above, but that these previously delineated inventions may be varied without departing from the scope of the inventions as described in the following claims.

What is claimed is:

1. A system for controlling a transfer case which is operatively disposed within a four-wheel drive vehicle of the type having a front driveshaft which rotatably drives a pair of front wheels having a first effective diameter at a first speed, and a rear driveshaft which rotatably drives a pair of rear wheels having a second effective diameter at a second speed, said transfer case being effective to selectively transfer torque to said front driveshaft and to said rear driveshaft, said system comprising:

a first sensor which measures said first speed and which generates a first signal which represents said first speed;

a second sensor which measures said second speed and which generates a second signal which represents said second speed; and a controller which is communicatively coupled to said transfer case and to said first sensor and said second sensor, and which receives said first signal and said second signal, and which calculates a difference value between said first speed and said second speed, said controller being adapted to selectively generate a slip control signal when said difference value exceeds an allowable slip value, said controller being further adapted to selectively alter said allowable slip value based upon said first effective diameter and said second effective diameter.

2. The system of claim 1 wherein said controller decreases said allowable slip value when said first effective diameter is substantially equal to said second effective diameter.

3. The system of claim 1 wherein said difference value is equal to said second value minus said first value.

4. The system of claim 1 wherein said allowable slip value is stored within a database table.

5. The system of claim 1 wherein said allowable slip value varies based upon said first speed and said second speed.

6. The system of claim 1 wherein said controller is further adapted to transmit said slip control signal to said transfer case, effective to alter the amount of torque provided to said front and said rear driveshafts.

7. The system of claim 1 wherein said controller alters said allowable slip value only after slower of said first and said second speed exceeds a threshold value for a predetermined period of time.

8. A method for controlling a transfer case which is operatively disposed within a four wheel drive vehicle of the type having a pair of front wheels having a first effective diameter and a pair of rear wheels having a second effective diameter, a front driveshaft which is effective to rotate said front wheels at a first speed and a rear driveshaft which is effective to rotate said rear wheels at a second speed, said transfer case being adapted to selectively provide torque to said front driveshaft and to said rear driveshaft, said method comprising the steps of:

selectively generating a first and a second allowable rear slip values;

determining whether a difference exists between said first and said second effective diameters;

selecting a unique one of said first and said second allowable rear slip values based upon said determination;

measuring said first speed and said second speed; and selectively generating a first signal if said second speed exceeds said first speed by a margin greater than said selected one of said first and said second allowable rear slip values, said first signal being effective to control said torque which is provided to said front and said rear driveshafts.

9. The method of claim 8 further comprising the steps of:

selectively generating a first and a second allowable front slip values;

determining whether a difference exists between said first and said second effective diameters;

selecting a unique one of said first and said second allowable front slip values based upon said determination; and selectively generating a second signal if said first speed exceeds said second speed by a margin greater than said selected one of said first and said second allowable front slip values, said second signal being effective to control said torque which is provided to said front and said rear driveshafts.

10. The method of claim 8 wherein said selection of said unique one of said first and second allowable rear slip values is based upon an amount by which said first effective diameter differs from said second effective diameter.

11. The method of claim 9 wherein said selection of said unique one of said first and second allowable front slip values is based upon an amount by which said first effective diameter differs from said second effective diameter.

12. The method of claim 9 wherein said first and second allowable front slip values and said first and second allowable rear slip values are each stored within a unique database table.

13. The method of claim 8 wherein said first allowable rear slip value is greater than said second allowable rear slip value.

14. The method of claim 13 wherein said second allowable rear slip value is selected when said first effective diameter is substantially equal to said second effective diameter.

15. The method of claim 9 wherein said first signal varies based upon said first speed.

16. A method for generating a slip table within a transfer case controller, said method comprising the steps of:

providing a plurality of columns which each corresponds to a unique one of a plurality of speed values;

providing a first row and a second row which cooperate with said plurality of columns to form said slip table; and storing a plurality of first values within said first row and storing a plurality of second values within said second row, and wherein at least one of said second values is less than at least one of said first values.

17. The method of claim 16 wherein said transfer case controller is disposed within a vehicle having a pair of front wheels with a first effective diameter and a pair of rear wheels with a second effective diameter, said controller being effective to select values from a unique one of said first row and said second row of said slip table to determine whether a slip condition exists, said unique one of said first and said second row being chosen by said controller based upon said first and said second effective diameters.

18. The method of claim 17 wherein said controller selects each of said plurality of values based upon a measured speed of said vehicle.

19. The method of claim 16 wherein said plurality of columns comprises twenty columns.

20. The method of claim 19 wherein said plurality of rows comprises four rows.

* * * * *